(12) United States Patent
Huang

(10) Patent No.: US 8,605,935 B1
(45) Date of Patent: Dec. 10, 2013

(54) HEADPHONES WITH A PAIR OF GLASSES

(76) Inventor: Wen-Tse Huang, Kaohsiung (TW)

(*) Notice: Subject to any disclaimer, the term of this patent is extended or adjusted under 35 U.S.C. 154(b) by 0 days.

(21) Appl. No.: 13/604,988

(22) Filed: Sep. 6, 2012

(51) Int. Cl.
*H04R 25/00* (2006.01)
*H04R 1/10* (2006.01)

(52) U.S. Cl.
CPC .............. *H04R 1/105* (2013.01); *H04R 1/1066* (2013.01); *H04R 1/1008* (2013.01)
USPC .......................................... 381/381; 381/374

(58) Field of Classification Search
USPC ......... 381/182, 370–381; 379/430; 455/575.2
See application file for complete search history.

(56) References Cited

U.S. PATENT DOCUMENTS

| | | | |
|---|---|---|---|
| 2007/0165899 A1* | 7/2007 | Garin | 381/377 |
| 2008/0002145 A1* | 1/2008 | Sanpei | 351/158 |
| 2009/0052716 A1* | 2/2009 | Yamaguchi et al. | 381/378 |
| 2009/0097688 A1* | 4/2009 | Lewis | 381/376 |

* cited by examiner

*Primary Examiner* — Tuan D Nguyen

(74) *Attorney, Agent, or Firm* — Alan Kamrath; Kamrath IP Lawfirm, P.A.

(57) ABSTRACT

Headphones with a pair of glasses include two headphone bodies, a glasses headband, and two engaging members. Each headphone body includes an engaging protrusion having a plurality of dentate portions. The glasses headband includes a glasses frame, two lenses on the glasses frame, and two extension sheets extended outwardly from two side ends of the glasses frame. Each engaging member is movably engaged with one of extension sheets and includes an annular ring having an inner peripheral face with a plurality of engaging teeth. The engaging protrusion of each headphone body is received in an associated annular ring, and the dentate portions of the engaging protrusion are coupled with the engaging teeth of the associated annular ring. Each annular ring is capable of rotating relative to an associated engaging protrusion, allowing a headphone user to use a pair of glasses simultaneously.

3 Claims, 5 Drawing Sheets

HEADPHONES WITH A PAIR OF GLASSES

BACKGROUND OF THE INVENTION

1. Field of the Invention

The present invention relates to headphones and, more particularly, to a pair of circumaural headphones equipped with a pair of glasses.

2. Description of the Related Art

The models of electronic music players such as MP3, MP4, PDA, and mobile phone have been diversified with development of digitalized music files, allowing people to listen music given off by music players outdoors. To enjoy acoustic fidelity without affecting other people, a user uses a music player in conjunction with headphones to output music from an audio source via the headphones. The models of headphones available in the market can be divided into earbud headphones, ear-clip headphones, and circumaural headphones. In general, a pair of circumaural headphones completely covering ears prevents sounds from leakage or distortion when sounds are delivered via the headphones. In addition, existing circumaural headphones based on moving-coil speakers are designed to have a larger volume, so that the moving-coil speakers encased in shells can create corresponding sound chambers to effectively promote quality of sound effects and sound fields. Accordingly, a pair of circumaural headphones is regarded as the model rendering acoustic fidelity superior to others.

Conventional circumaural headphones generally include a headband-like hoop with an elastic holding function to engage two audio receivers. To listen music, a headphone user may adjust a length of the hoop to be placed over his/her head and to take two audio receivers to cover ears. However, the fact that a glasses user demands acoustic fidelity but has no chance to pick up a pair of headphones has been a noteworthy issue because the circumaural headphone user with ears covered by ear pads cannot wear a pair of glasses (e.g., sunglasses, glasses for nearsightedness, or artistic plain glass spectacles). Moreover, the stereotypical structure of circumaural headphones based on prior arts cannot encourage consumers' appetite to buy headphones.

BRIEF SUMMARY OF THE INVENTION

In order to improve the aforementioned problems, a primary objective of the present invention is to provide headphones with a pair of glasses which avoid a shortcoming of conventional headphones by allowing the headphones and a pair of glasses to be worn by a user simultaneously. Furthermore, the headphones featuring novel fashionable aesthetics is of service to product competitiveness.

To achieve the foregoing objective, headphones with a pair of glasses of the present invention includes two headphone bodies, a glasses headband, and two engaging members. Each headphone body includes an ear pad and an engaging protrusion provided on an outer end face of the ear pad. Each engaging protrusion has an annular rim on a periphery thereof, and a plurality of dentate portions is formed around the annular rim. The glasses headband includes a glasses frame, two lenses provided on the glasses frame, and two extension sheets each extending outwardly from one of two side ends of the glasses frame. A stop block is formed on a terminal of each extension sheet. Each engaging member includes first and second ends and a grip groove extending from the first end toward the second end thereof. A limit groove is formed in each engaging member and in communication with an associated grip groove. Each extension sheet of the glasses headband is movably received in the grip groove of one of the engaging members, and each stop block is movably received in the limit groove of one of the engaging members. Each engaging member further includes an annular ring extended outwardly from the second end thereof and having an inner peripheral face. At least one engaging tooth is provided on the inner peripheral face of each annular ring. The engaging protrusion of each headphone body is received in the annular ring of one of the engaging members with the dentate portions of the engaging protrusion coupled with the engaging tooth of the annular ring. Each annular ring is capable of rotating relative to the engaging protrusion of one of the headphone bodies.

In a preferred form, a plurality of engaging teeth is provided on the inner peripheral face of each annular ring. A raised retaining portion is formed around an outer end of each annular rim and abuts an outer end edge of one of the annular rings to avoid the engaging protrusions to be separated from the annular rings. The glasses frame and the lenses of the glasses headband are in the form of a pair of sunglasses, prescription glasses, or artistic plain glass spectacles.

The present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

DETAILED DESCRIPTION OF THE INVENTION

Figure 1:
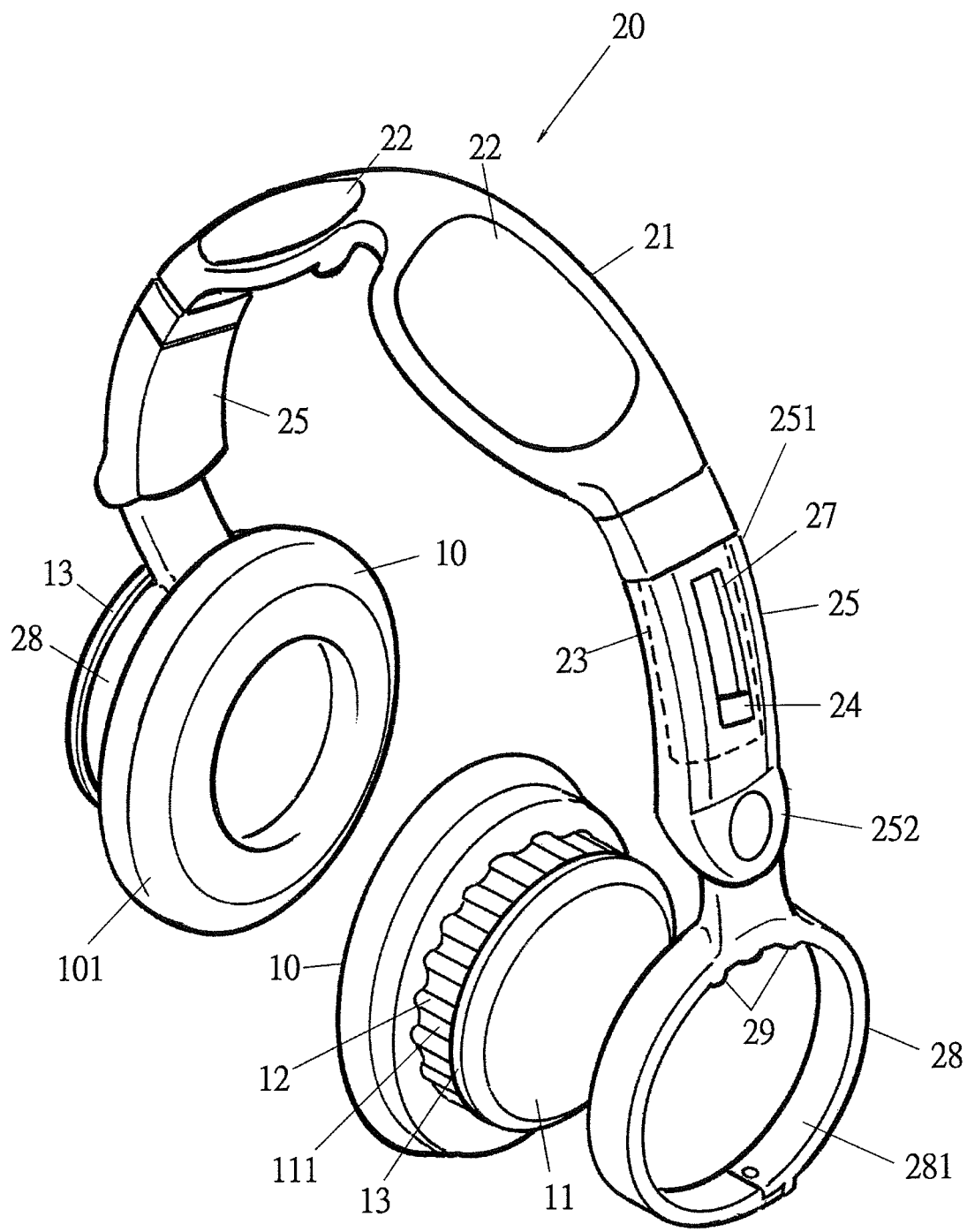
FIG. 1 is a perspective view of headphones with a pair of glasses according to the preferred teachings of the present invention, with a headphone body separated from an engaging member.

Headphones with a pair of glasses according to the preferred teachings of the present invention are shown in FIGS. 1 through 5 of the drawings and generally include two headphone bodies 10 and a glasses headband 20. In the embodiment, the headphones of the present invention are in the form of circumaural headphones. Each headphone body 10 is provided with a receiver or an ear pad 101 which is adapted for covering an ear of a user and outputs music from an audio source (not shown). Each headphone body 10 further includes an engaging protrusion 11 provided on an outer end face of the ear pad 101 and having an annular rim 111 on a periphery thereof. In the embodiment, a plurality of undulated dentate portions 12 is formed around the annular rim 111 of the engaging protrusion 11, and a raised retaining portion 13 is formed around an outer end of the annular rim 111. The glasses headband 20 includes a glasses frame 21 and two lenses 22 provided on the glasses frame 21. The glasses headband 20 further includes two temples or extension sheets 23 each of which is extended outwardly from one of two side ends of the glasses frame 21 and includes a stop block 24 formed on a terminal thereof.

Figure 2:
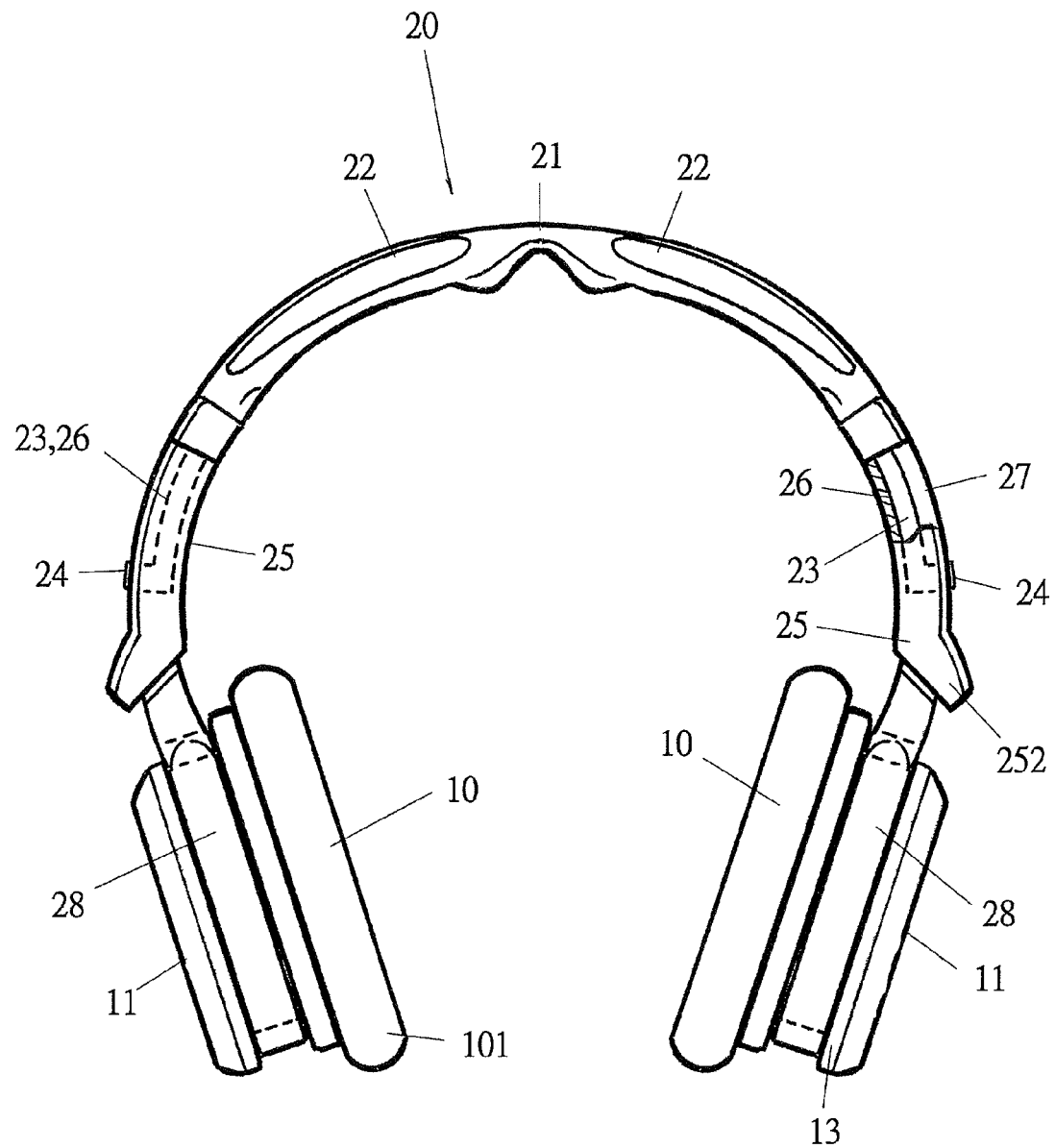
FIG. 2 is a schematic plane view of the headphones of FIG. 1.

In the embodiment, the headphones of the present invention further includes two engaging members 25 each including first and second ends 251 and 252 spaced apart in a length direction thereof. Each engaging member 25 further includes a grip groove 26 extending from the first end 251 toward but spaced from the second end 252 thereof. A limit groove 27 is formed in an outer surface of each engaging member 25 and in communication with an associated grip groove 26. Each of the extension sheets 23 of the glasses headband 20 is movably inserted into the grip groove 26 in one of the engaging members 25 from the first end 251, with each stop block 24 received in and exposed from an associated limit groove 27 (FIG. 2). Each extension sheet 23 to which an appropriate force is applied can be moved in the associated grip groove 26 in the length direction. The stop blocks 24 are used to limit displacement of the extension sheets 23 so that the extension sheets 23 do not drop out of the grip grooves 26. Furthermore, each engaging member 25 further includes an annular ring 28 extended outwardly from the second end 252 thereof and having an inner peripheral face 281. At least one engaging tooth 29 is formed on the inner peripheral face 281 of each annular ring 28. In the embodiment, a plurality of engaging teeth 29 is provided on the inner peripheral face 281 of each annular ring 28 adjacent to the second end 252. The engaging protrusion 11 of each headphone body 10 is appropriately received in one of the annular rings 28 with the dentate portions 12 of the engaging protrusion 11 exactly coupled with the engaging teeth 29 of the annular ring 28 and with the retaining portion 13 abutting an outer end edge of the annular ring 28 to avoid the engaging protrusion 11 to be separated from the annular ring 28 (see FIG. 2). Each annular ring 28 is capable of rotating relative to the engaging protrusion 11 of one of the headphone bodies 10 when an appropriate force is applied to the glasses headband 20 and/or an associated headphone body 10.

Figure 3:
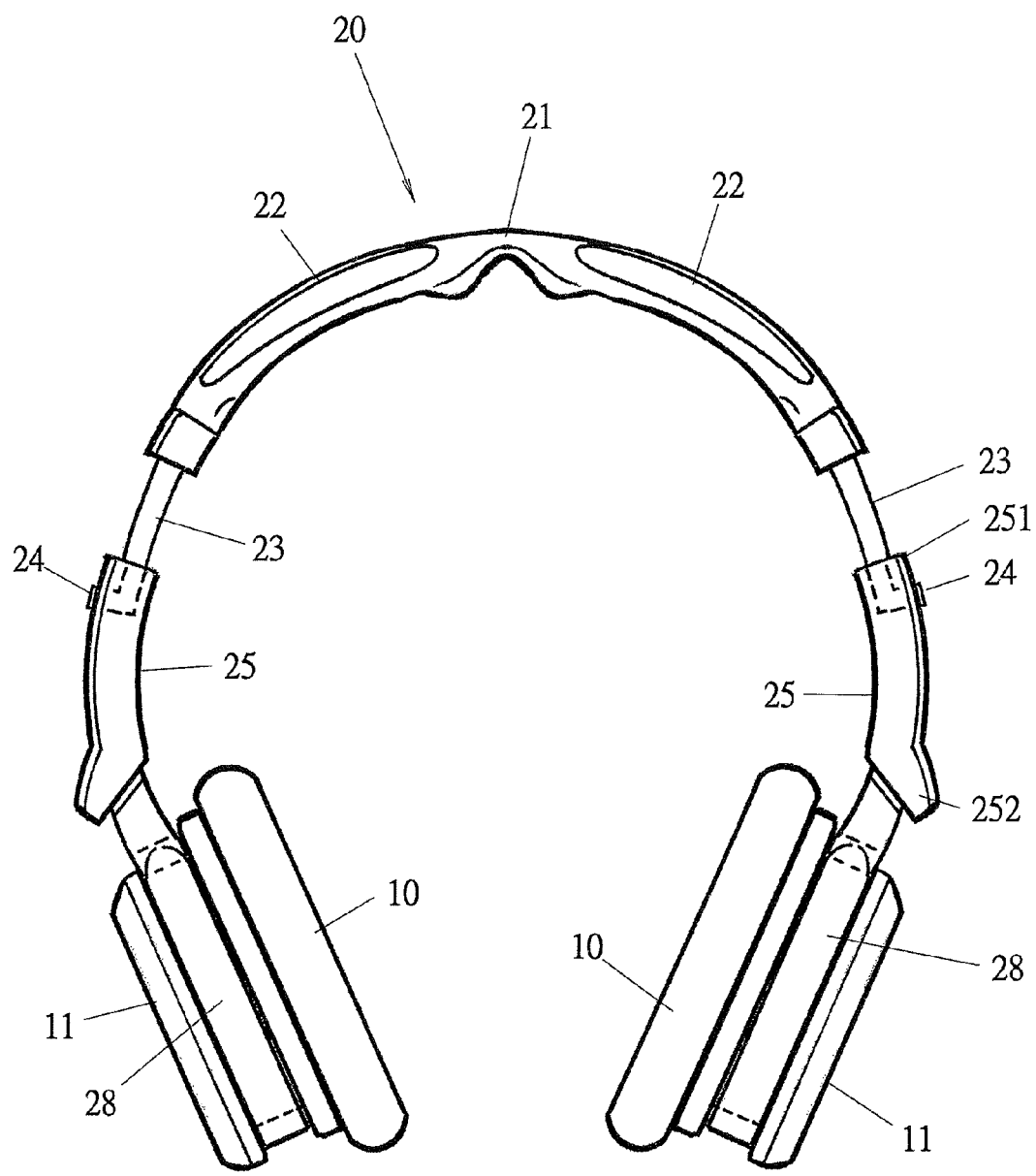
FIG. 3 is a view similar to FIG. 2, illustrating a length adjustment of a glasses headband of the headphones of FIG. 2.
Figure 4:
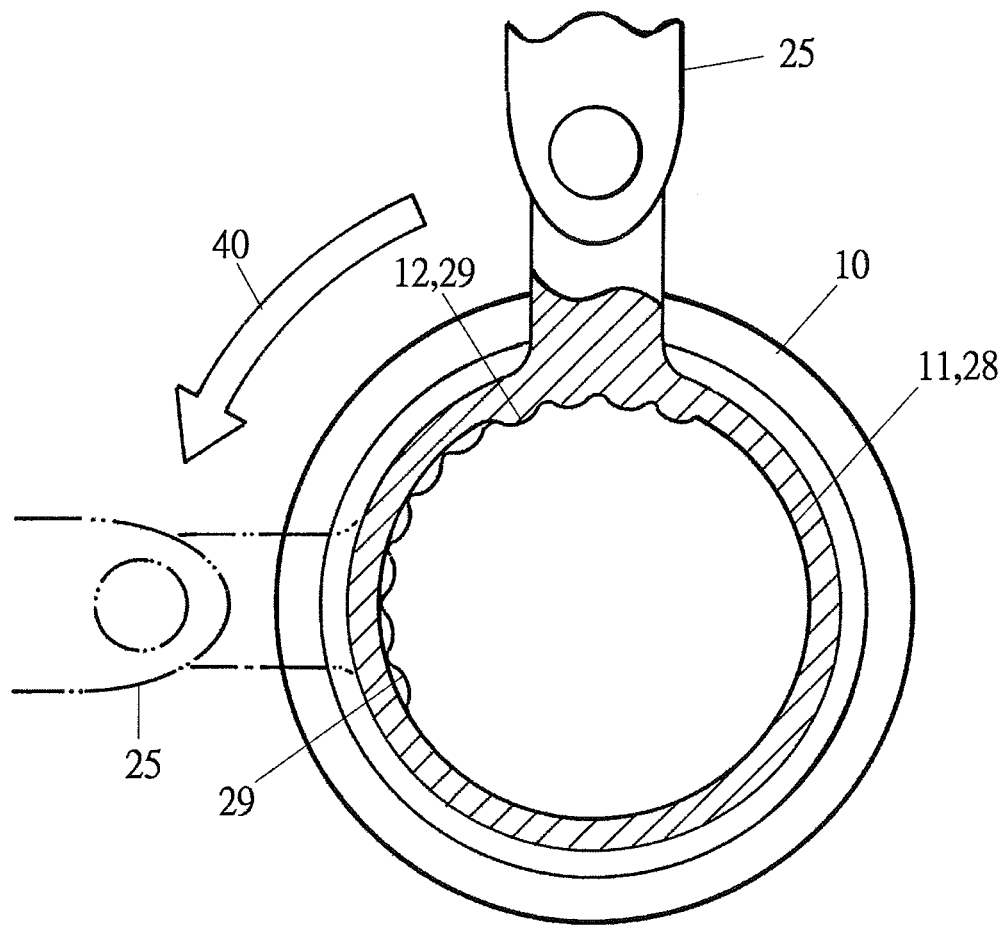
FIG. 4 is a partial, schematic cross-sectional view of the headphones of FIG. 2, illustrating an angular position adjustment of the engaging member relative to the headphone body.

The extension sheets 23 is closely received in the grip grooves 26 of the engaging members 25 respectively, allowing displacement of the extension sheets 23 relative to the engaging members 25 in order to adjust distances between the glasses headband 20 and the headphone bodies 10 (FIGS. 2 and 3). Further, by combination of the dentate portions 12 with the engaging teeth 29, each of the annular rings 28 is exactly coupled around the engaging protrusion 11 of one of the headphone bodies 10, so that different angular positions of the glasses frame 21 of the glasses headband 20 relative to the headphone bodies 10 can be easily adjusted (see an arrow 40 in FIG. 4).

Figure 5:
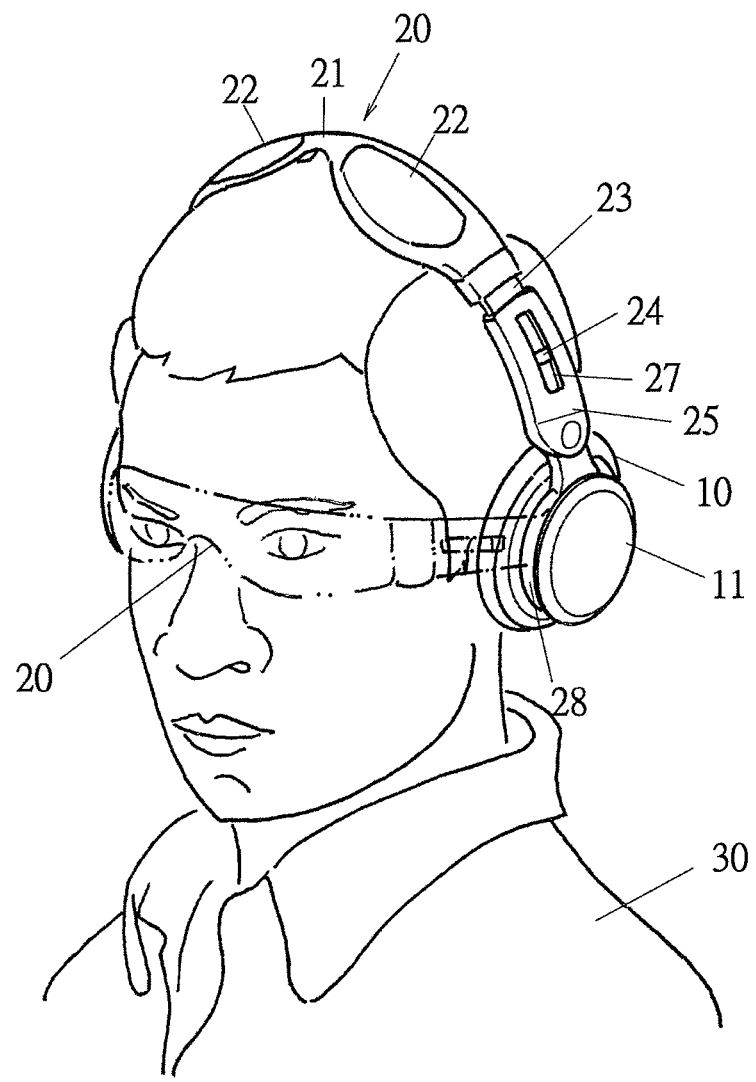
FIG. 5 shows a schematic view of a user wearing the headphones of the present invention.

FIG. 5 illustrates the headphone bodies 10 of the headphones of the present invention cover ears, and the glasses headband 20 is fixed on a head of the user 30. The headphones of the present invention allows the user 30 to adjust a distance between the glasses frame 21 and the engaging member 25 by moving the extension sheet 23 for the purpose of the headphones comfortably worn on the user's head and music from an audio source heard by the user 30. Further, when the user 30 has a requirement of eyeglasses, the glasses headband 20 to which an appropriate force is applied is turned about 90 degrees to make the glasses frame 21 of the glasses headband 20 corresponding to eyes of the user 30, allowing the glasses headband 20 to be used as one pair of eyeglasses. Moreover, the headphones according to the present invention with novel fashionable aesthetics different from conventional fashion allows the user to wear one pair of circumaural headphones and a pair of glasses simultaneously and further possesses superior market competitiveness and industrial values.

It can be appreciated that the glasses frame 21 and lenses 22 of the glasses headband 20 have its style imitated from other types of available eyeglasses for shading, vision correction, or aesthetics. That is, the glasses frame 21 and lenses 22 can be constructed to be a pair of sunglasses, prescription glasses, or artistic plain glass spectacles.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. Headphones with a pair of glasses comprising:
two headphone bodies, each including an ear pad and an engaging protrusion provided on an outer end face of the ear pad, with each engaging protrusion having an annular rim on a periphery thereof, with a plurality of dentate portions formed around the annular rim of each engaging protrusion,
a glasses headband including a glasses frame and two lenses provided on the glasses frame, with the glasses headband further including two extension sheets each of which is extended outwardly from one of two side ends of the glasses frame, with a stop block formed on a terminal of each extension sheet, and
two engaging members each including first and second ends and a grip groove extending from the first end toward the second end thereof, with a limit groove formed in each engaging member and in communication with an associated grip groove, with each extension sheet of the glasses headband movably received in the grip groove of one of the engaging members, with each stop block received in the limit groove of one of the engaging members, with each engaging member further including an annular ring extended outwardly from the second end thereof and having an inner peripheral face with at least one engaging tooth, with the engaging protrusion of each headphone body received in the annular ring of one of the engaging members, with the dentate portions of each engaging protrusion coupled with the engaging tooth of an associated annular ring, with each annular ring being capable of rotating relative to the engaging protrusion of one of the headphone bodies.

2. The headphones with a pair of glasses according to claim 1, with a plurality of engaging teeth provided on the inner peripheral face of each annular ring, with a raised retaining portion formed around an outer end of each annular rim and abutting an outer end edge of an associated annular ring to avoid the engaging protrusions to be separated from the annular rings.

3. The headphones with a pair of glasses according to claim 2, with the glasses frame and the lenses of the glasses headband being in the form of a pair of sunglasses, prescription glasses, or artistic plain glass spectacles.

* * * * *